H. A. MINER.
TIRE SETTING DEVICE.
APPLICATION FILED NOV. 6, 1912.
1,113,133. Patented Oct. 6, 1914.
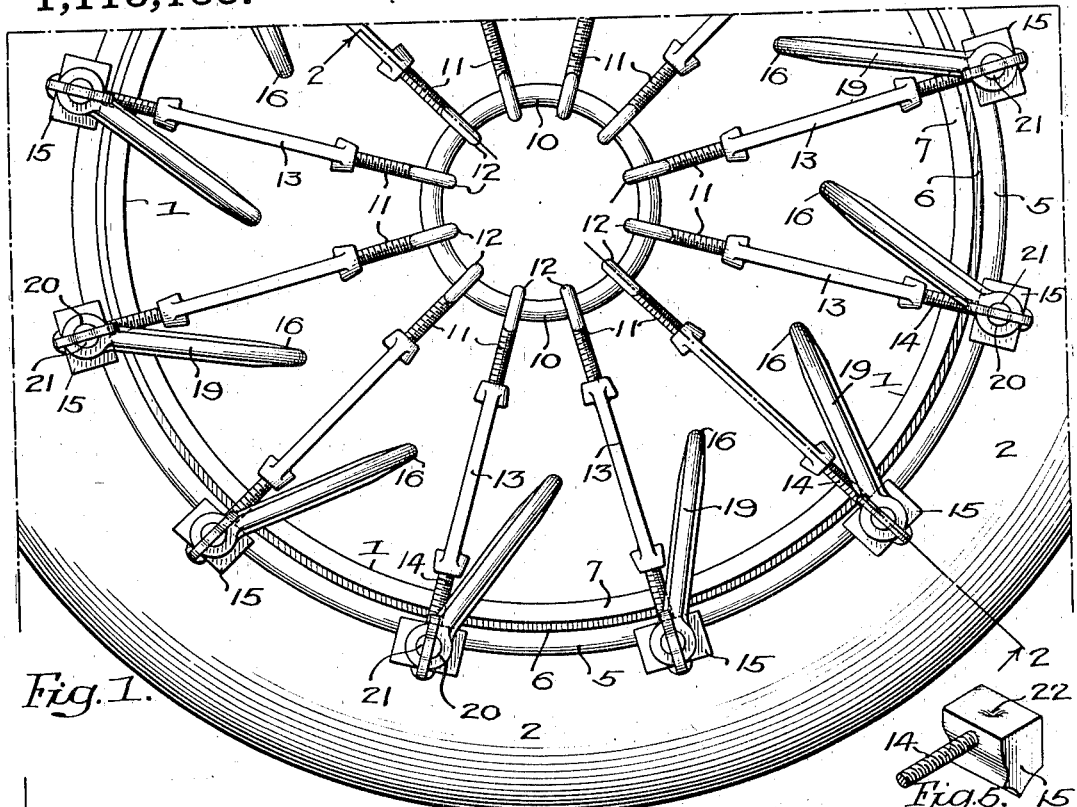
Fig. 1.
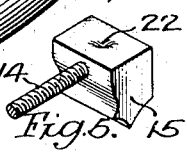
Fig. 5.
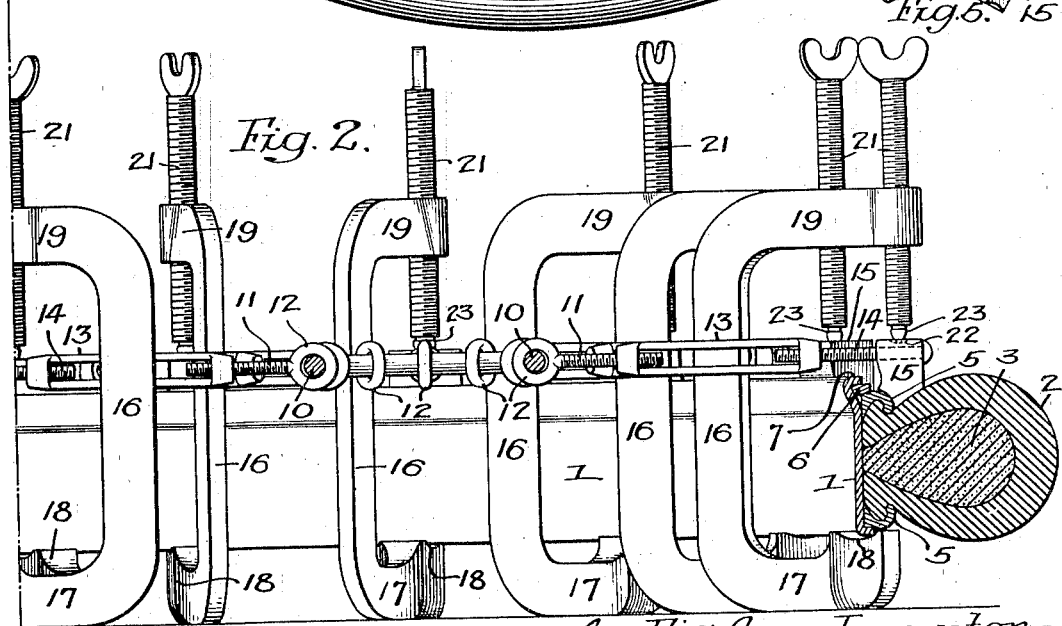
Fig. 2.
Fig. 3. Fig. 4.
Witnesses—
Will A. Burrows
Walter Chisny
Inventor—
Howard A. Miner
by his Attorneys
Howson & Howson

UNITED STATES PATENT OFFICE.

HOWARD A. MINER, OF PHILADELPHIA, PENNSYLVANIA.

TIRE-SETTING DEVICE.

1,113,133.  Specification of Letters Patent.  Patented Oct. 6, 1914.

Application filed November 6, 1912. Serial No. 729,804.

*To all whom it may concern:*

Be it known that I, HOWARD A. MINER, a citizen of the United States, residing in Philadelphia, Pennsylvania, have invented certain Improvements in Tire-Setting Devices, of which the following is a specification.

My invention relates to means for applying automobile tires to the wheel rims, and is more particularly directed to and consists of an improved device designed to apply to a rim an automobile tire filled with an elastic or compressible material in lieu of air, wherein it is necessary that a certain amount of compression be given such elastic filler during the application of the tire to the rim. These and other features of my invention are more fully described hereinafter, reference being had to the accompanying drawings, in which:

Figure 1, is a plan view of a tire setting device embodying my invention; Fig. 2, is a sectional view on the line 2—2, Fig. 1; Fig. 3, is a sectional plan view of one of the clamping elements; Fig. 4, is a sectional view on the line 4—4, Fig. 3, and Fig. 5, is a perspective view of a clamping block.

In the accompanying drawings, 1 represents a rim, and 2 an ordinary automobile tire which, in the present instance, contains elastic filling material indicated at 3. In the tire shown, which is of the clencher type, detachable flanges 5 are employed, with a locking ring 6, which is interposed between one of said clencher rings and a flanged edge 7 of the rim. This tire is of the type commonly known as "quick detachable."

Centrally disposed with respect to the tire rim is a ring 10, carrying the setting elements. In this connection it is to be noted that the structure forming the subect of my invention may be applied to a rim of the detachable type off the wheel or it may be applied to any type of rim when on the wheel. Carried by the ring 10 are a series of screw bolts 11 having eyes 12 whereby they may be strung on said ring, and attached to these screw bolts are turnbuckles 13, connected at their opposite ends to screw bolts 14 carrying blocks 15, which blocks are designed and are shaped to fit against the tire and one of the detachable flanges so that pressure applied thereto will force the tire and said detachable flange into such relation with respect to the rim that the locking ring may be applied. The screw bolts 12 and 14 and the turnbuckles 13, make up connecting elements which may be readily adjusted in length for use with tires of different diameters. In order to apply this pressure, I provide clamping elements comprising bracket frames 16 having arms 17 on one side provided with curved seats 18 for the rim, (see Fig. 3), and carrying at the opposite end arms 19 with threaded apertures 20 for the reception of screw bolts 21 adapted to engage the blocks 15. By preference, these blocks are socketed at 22, and the screw bolts may be provided with pointed ends 23 whereby they may be centered with respect to said blocks to insure application of the desired pressure at the proper point.

In practice, the setting device is applied with the clamping elements properly disposed with respect to the tire, and these are successively turned down so as to apply the pressure gradually. When the detachable flange engaged by the blocks 15 has been pressed down to such an extent that the locking ring may be applied, the latter is set in place and its ends secured and then the clamps may be removed.

I claim:

1. In a tire setting device, the combination of a plurality of arms, pressure blocks carried by the outer ends of said arms, means for confining the inner ends of said arms, and means independent of the arms and blocks for clamping said blocks against the tire.

2. In a tire setting device, the combination of a plurality of longitudinally adjustable arms, pressure blocks adjustably carried at the outer ends of said arms, a ring for confining the inner ends of said arms, and means for clamping said blocks against the tire.

3. In a tire setting device, the combination with a tire and its rim, of a central ring normally unsupported, adjustable bolts radiating from said ring, pressure blocks adjustably mounted at the ends of said bolts, and screw clamping means including a member having a portion in engagement with the rim and a portion engaging said blocks to press the latter against the tire and the opposite edge of said rim.

4. In a tire setting device, the combination with a tire and its rim, of a centrally disposed and normally unsupported ring, a plurality of eye-bolts carried by said ring and radiating therefrom, a plurality of pressure blocks, bolts carried by said blocks, turnbuckles connecting said block bolts and eyebolts in line, a plurality of clamping devices, each having a portion in engagement with one side of the rim, and screws carried by said clamping devices and engaging the blocks to force the latter against the tire and the opposite edge of said rim.

In testimony whereof, I have signed my name to this specification, in the presence of two subscribing witnesses.

HOWARD A. MINER.

Witnesses:
MURRAY C. BOYER,
WM. A. BARR.